United States Patent [19]
Hirschberg et al.

[11] Patent Number: 5,101,743
[45] Date of Patent: Apr. 7, 1992

[54] FLUID BED INCINERATION

[75] Inventors: Eugene H. Hirschberg, Park Forest; George A. Huff, Jr., Naperville, both of Ill.

[73] Assignee: Amoco Corporation, Chicago, Ill.

[21] Appl. No.: 621,865

[22] Filed: Dec. 4, 1990

[51] Int. Cl.[5] .............................. F23B 7/00
[52] U.S. Cl. .................. 110/345; 110/342; 110/347; 110/245
[58] Field of Search ........ 110/245, 203, 345; 432/58, 15, 72; 431/10

[56] References Cited

U.S. PATENT DOCUMENTS

| | | | |
|---|---|---|---|
| 4,154,585 | 5/1979 | Melcher et al. | 110/345 |
| 4,469,033 | 9/1984 | Michelfelder et al. | 110/344 |
| 4,831,942 | 5/1989 | Morimoto et al. | 110/347 |
| 4,836,117 | 6/1989 | Teller et al. | 110/345 |
| 4,843,980 | 7/1989 | Markham et al. | 110/342 |
| 4,938,156 | 7/1990 | Yahata | 110/245 |
| 4,960,057 | 10/1990 | Ohshita et al. | 110/345 |
| 5,001,994 | 3/1991 | Morimoto et al. | 110/342 |

Primary Examiner—Henry C. Yuen
Attorney, Agent, or Firm—Thomas A. Yassen; William H. Magidson; Ralph C. Medhurst

[57] ABSTRACT

The present invention relates to a process and a catalyst for the fluid bed incineration of a combustible hydrocarbon feedstock. The process comprises contacting the feedstock with a mixture of a fluidized heat transfer media and a combustion promoter catalyst, in the presence of an oxygen-containing gas stream in excess of that required for complete combustion of the carbon monoxide formed, at feedstock combustion conditions. The combustion promoter catalyst consists essentially of particulate with a particle size of greater than 100 microns and includes a promoter metal present in an amount to provide a substantially carbon monoxide-free flue gas.

28 Claims, 7 Drawing Sheets

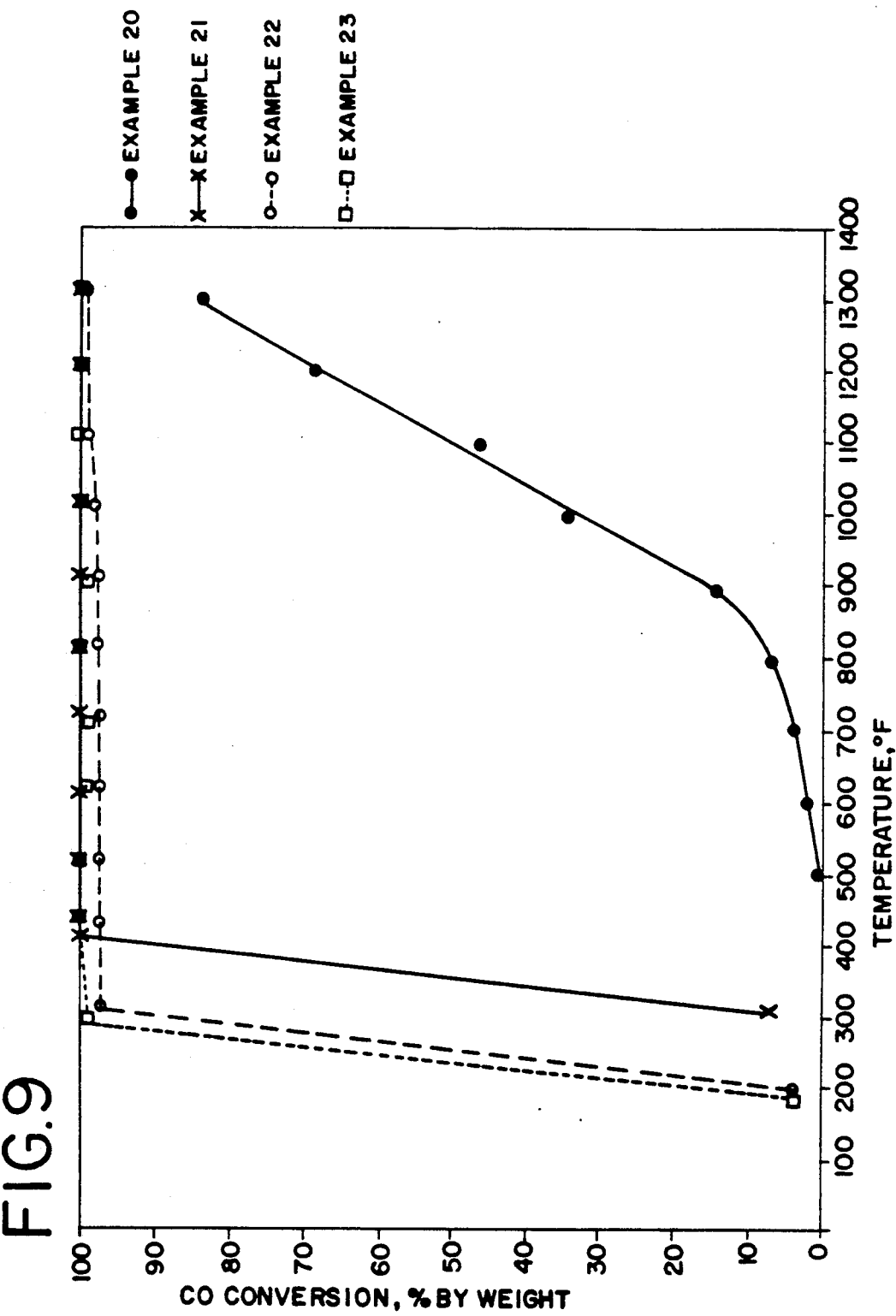

FLUID BED INCINERATION

BACKGROUND OF THE INVENTION

This invention relates to a process and catalyst for the incineration of a combustible hydrocarbon feedstock. More particularly, this invention relates to a process and catalyst for the fluid bed incineration of a combustible feedstock in the presence of a combustion promoter catalyst where low levels of flue gas carbon monoxide can be attained at favorably lower combustion temperatures.

The development of efficient methods for reducing the volume of wastes, including hydrocarbon waste, is becoming an important industry objective. Refineries, petrochemical plants, and public utilities often must dispose of waste hydrocarbon or hydrocarbon fuel that cannot be costeffectively refined or modified into saleable product. Alternatively, land-filling unsalable hydrocarbon is costly, and the costs escalate with the volume of hydrocarbon, the hazard and toxicity of the hydrocarbon, and its ease of handling. Moreover, landfill space is becoming more and more limited. Fluid bed incinerators (FBI) have been widely used by industry and public utilities to reduce the volume, toxicity, and facilitate ease of handling of unsalable hydrocarbon by combusting a substantial portion of the hydrocarbon to carbon dioxide and water.

FBI generally comprise feedstock preparation facilities, a reactor section, flue gas handling facilities, and solids handling facilities. The reactor section is where the combustion reaction occurs and can comprise a reactor vessel having a bed of an inert heat transfer media. For purposes of this invention, the term "inert heat transfer media" is defined as a particulate media substantially incapable of catalytically converting high boiling hydrocarbon into lower boiling gasoline and distillate. The heat transfer media can be a silica sand or chemical pellets and can include ash produced in the combustion process. The heat transfer media functions as a heat reservoir for vaporizing water present in the feedstock. The energy supplied to the heat transfer media from the heat of combustion of the FBI feedstock provides most of the heat requirements for feedstock water vaporization but can be supplemented by auxiliary fuel usage.

A problem attendant to FBIs and other processes relying on combustion steps such as coal gasification and fluidized bed coking is the adverse effects of incomplete combustion to carbon monoxide. Incomplete combustion of unsalable hydrocarbon is environmentally deleterious and represents a wasted source of energy. The further oxidation of carbon monoxide to carbon dioxide releases approximately 4,350 Btu/lb of carbon monoxide oxidized.

Industrial and utility operators of FBIs have, in some cases, overcome incomplete combustion conditions by increasing excess oxygen levels in the flue gas zone or increasing the flue gas zone temperature, both facilitating higher conversion of carbon monoxide to carbon dioxide. Increasing excess oxygen levels is often very costly due the energy costs inherent with adding additional combustion air or oxygen volume to the flue gas zone, heating this excess volume from ambient conditions to combustion stack outlet temperatures, and discharging this volume to the atmosphere. Increasing the flue gas zone temperature adversely increases the level of metal compound emissions to the atmosphere due to increased vaporization of these materials in the reactor vessel. Moreover, increasing the flue gas zone temperature inefficiently increases radiant heat losses through the combustion device hardware and, more seriously, causes damage to device hardware.

High flue gas and combustion zone temperatures greatly reduce the hardware life of combustion devices such as FBIs. FBIs can operate at temperatures of from about 500° F. to about 3000° F. and often must resist abrasion caused by fluidized solids circulating at high velocities. FBIs, as well as most high temperature combustion devices, are generally equipped with specialized refractory, designed to resist high temperature and erosive environments. In spite of modern refractory technology, high temperature operation greatly increases the occurrences of refractory damage, damage to the FBI steel structures, and the frequency and duration of facility downtime.

While there exists a great need to recognize, identify, and solve the environmental and energy related problems associated with incomplete combustion in the process of fluid bed incineration, the art has been devoid of teachings, and industry has largely acquiesced to the costly solutions described above.

Carbon monoxide combustion promotion techniques, however, have been taught for use with other unrelated processes requiring a hydrocarbon combustion step. These techniques have met with varying degrees of success.

Carbon monoxide combustion promotion has been performed in fluid catalytic cracking facilities. U.S. Pat. Nos. 4,146,463 (Radford et al.), 4,204,945 (Flanders et al.), 4,252,632 (Mooi), and 4,435,282 (Bertolacini et al.) all disclose processes for enhanced conversion of carbon monoxide to carbon dioxide in the regenerator section of a fluid catalytic cracking unit using a combustion-promoting catalyst. These catalysts are either modified cracking catalysts or are added as a supplement to conventional cracking catalysts and are reacted with, attrited, and replenished along with the cracking catalyst before the combustion promoter catalyst can be deactivated or physically destroyed. As a result, particle attrition through regenerator cyclone systems, particle durability, particulate fluidization, and particulate mixing have not been as controlling and critical in nature as in the process of the present invention. Moreover, promoter catalyst deactivation is less critical since the promoted catalyst is continuously replaced. In practice, a fluid catalytic cracking combustion promoter would not achieve the process objectives of the fluid bed incineration catalyst and process of the present invention (see Example 24).

It is therefore an object of the present invention to provide a process and catalyst for fluid bed incineration that reduces air pollution by achieving reduced flue gas carbon monoxide levels emitted to the atmosphere.

It is another object of the present invention to provide a process and catalyst for fluid bed incineration that reduces air pollution by achieving reduced flue gas metals levels emitted to the atmosphere.

It is another object of the present invention to provide a process and catalyst for fluid bed incineration that achieves reduced levels of hydrocarbon and other products of incomplete combustion (PIC'S) at lower operating temperatures.

It is yet another object of the present invention to provide a process and catalyst for fluid bed incineration that extends incinerator equipment life, reduces maintenance costs, and reduces the frequency and duration of facility downtime.

It is yet another object of the present invention to provide a process and catalyst for fluid bed incineration with reduced energy costs.

SUMMARY OF THE INVENTION

The above objects can be attained by providing a process for the incineration of a combustible hydrocarbon feedstock comprising contacting the feedstock with a fluidized heat transfer media and a combustion promoter, in the presence of an oxygen-containing gas stream in excess of that required for complete combustion of the carbon monoxide formed, at feedstock combustion conditions, the combustion promoter catalyst comprising particulates having a particle size of greater than 100 microns and having a promoter metal present in an amount to provide a substantially carbon monoxide-free flue gas.

The fluid bed incineration process of the present invention includes addition of a combustion promoter catalyst that results in substantial reductions in carbon monoxide levels reaching the atmosphere. The carbon monoxide reduction reduces air pollution and the energy requirements necessary to operate the FBI by recovering the heat released from converting additional carbon monoxide to carbon dioxide.

The fluid bed incineration process of the present invention results in a substantially lower operating temperature and lower radiant heat losses which result in lower energy costs. In addition, lower operating temperatures result in lower routine maintenance costs from repairs of refractory and steel damage often incurred during operation. Moreover, new facilities can be constructed with lower thicknesses of less expensive refractory and reduced steel thicknesses, saving capital costs.

The fluid bed incineration process of the present invention results in a substantially lower operating temperature which provides for substantially lower levels of hazardous metals emitted to the atmosphere. The lower operating temperature reduces metal vaporization into the emitted flue gas. Moreover, lower operating temperatures reduce the superficial velocity in the FBI, thereby reducing metal particulate entrainment and the potential for breakthrough into the atmosphere.

The fluid bed incineration process and catalyst of the present invention include addition of a combustion promoter catalyst with high attrition resistance, superior fluidization characteristics, and excellent mixing characteristics. The catalyst is also highly resistant to contaminants inherent in the feedstocks to FBIs and other combustion devices while maintaining its ability to oxidize carbon monoxide. The catalyst is not limited to use in FBIs and can be used in processes such as coal gasification and fluidized bed coking.

A more detailed explanation is provided in the following description and appended claims taken in conjunction with the accompanying figures.

BRIEF DESCRIPTION OF THE DRAWINGS

FIG. 9 is a graph illustrating the effects of sludge deposits and typical FBI process conditions on the combustion promoter catalyst carbon monoxide oxidation curves.

DETAILED DESCRIPTION OF THE INVENTION

Figure 1:
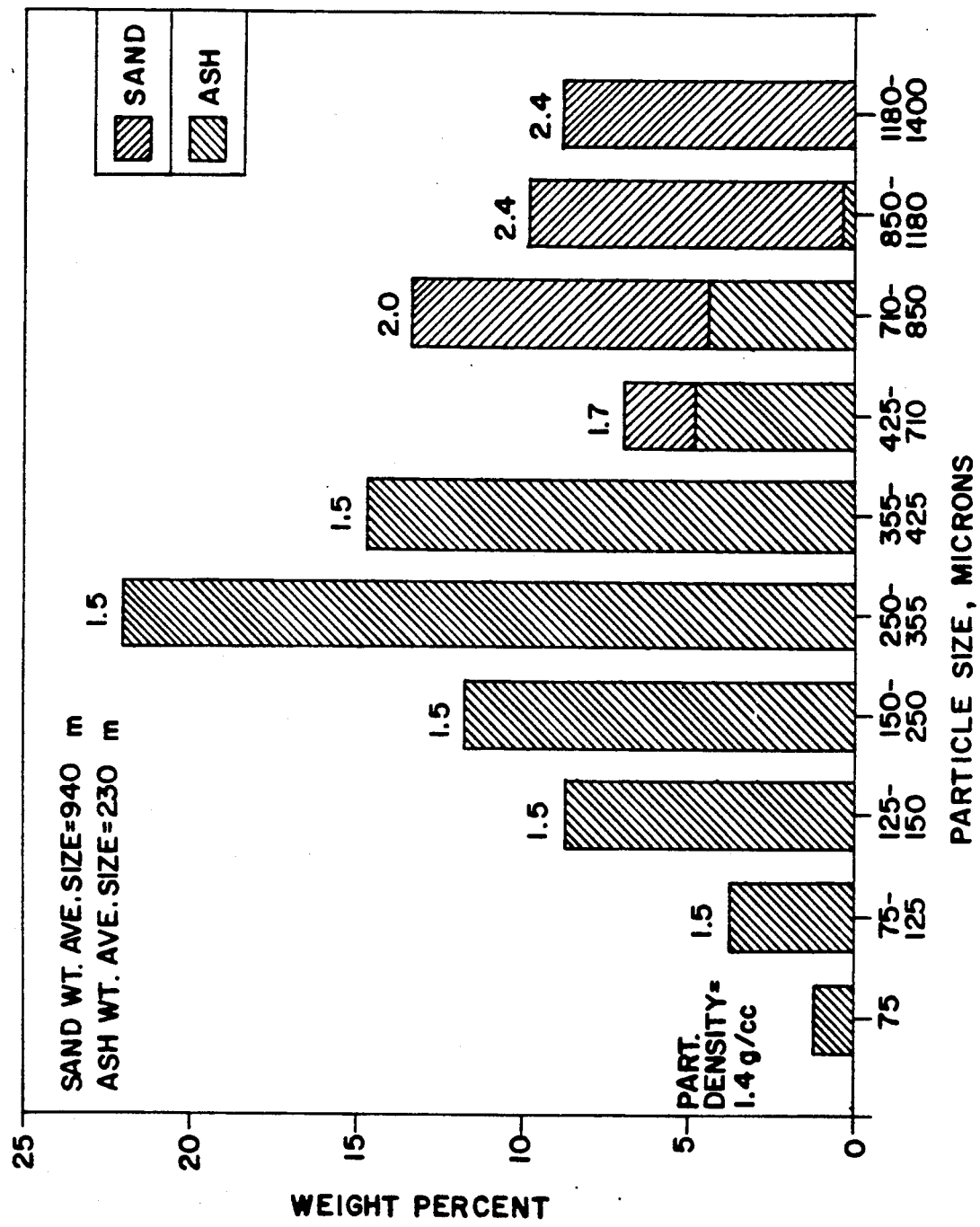
FIG. 1 is a graph describing a typical size distribution for the heat transfer media in an FBI.

The feedstock for use in the incineration process of the present invention can comprise most materials that are combustible in the presence of oxygen at temperatures within the operating range of the incineration device. These materials are generally, but not limited to, hydrocarbons.

FBI feedstocks can comprise hydrocarbon streams produced in a refinery or petrochemical plant such as waste streams and by-product streams. Waste streams can comprise materials recovered from the reclamation areas of a petroleum refinery or petrochemical plant including, but not limited to, air flotation tank hydrocarbon skimmings, oil/water separator sludge, and biopond sludge. FBI feedstocks can also comprise by-product streams from a petroleum facility or petrochemical plant that may prove too costly or difficult to reprocess into saleable products such as off-specification or used lubricating oils having high metal additives which are often detrimental to catalytic processes, spent caustic, spent solvents, chlorine-containing feeds, and storage tank cleaning deposits.

FBI feedstocks can also comprise feedstocks from utilities including energy producing utilities and sanitation utilities. The process of the present invention can apply, in the energy sector, to the combustion of coal and residual coke in energy producing facilities using the fluid bed combustion of fuel sources. The process of the present invention can also apply to utilities that incinerate municipal wastes such as municipal solid wastes, sewage sludges, and hospital waste.

FBI feedstocks can also range widely in water content extending from trace amounts of water to as much as 90 percent by weight water. High water contents are often inherent to oil collection devices found in refinery, petrochemical plant, or utility devices such as, but not limited to, separators, skimmers, and filter presses.

Similarly, FBI feedstocks can also contain a substantial amount of solids, some of which can be recovered through refinery or petrochemical plant reclamation facilities. An FBI feedstock can comprise as much as 50 percent by weight solids but more typically will comprise from zero percent to 25 percent solids by weight.

Since the process of the present invention can have application in processes other than FBIs and energy producing utilities having combustion devices such as a petroleum refinery fluidized bed coker and a petroleum refinery fluid catalytic cracking unit, the feedstock can comprise coked catalyst, residual coke, or other suitable combustible materials.

In accordance with the present invention, the combustion promoter catalyst comprises a combustion-promoting metal dispersed on a catalyst support. The support for the oxidation catalyst can be less catalytically active or even inert to the oxidation reaction. Desirably, the support is porous and has a surface area as determined by test method ASTM D-3663-84, including the area of the pores on the surface, of at least from about 2 $m^2/gm$ to about 250 $m^2/gm$, preferably from about 50 $m^2/gm$ to about 200 $m^2/gm$, and more preferably from about 80 $m^2/gm$ to about 150 $m^2/gm$ for best results. Suitable supports for use in the present invention include mullite, spinel, sand, silica, alumina, silica alumina, titania, zirconia, alpha alumina, gamma alumina, delta alumina, and eta alumina. Supports comprising alpha alumina, gamma alumina, silica, or silica alumina are preferred. Supports comprising alpha alumina or gamma alumina are more preferred.

The support component of the combustion promoter catalyst can be pure or a composite of materials. Composite supports are advantageous where there is a desire to add particular chemical or physical characteristics to the combustion promoter catalyst. For example, the promoter catalyst can comprise a substrate and a substrate coating in order to attain the particular benefits of both substrate materials having high attrition resistance and substrate coating materials having high surface area. The substrate and substrate coating can be combined through conventional impregnation techniques, controlled calcination, mechanical deposition, and coating. Suitable materials for use as a composite substrate for the combustion promoter catalyst are mullite, spinel, alpha alumina, and sand. Alpha alumina is the preferred composite substrate. Suitable materials for use as a composite substrate coating are silica, alumina, titania, silica alumina, zirconia, gamma alumina, delta alumina, and eta alumina. Composite substrate coatings comprising silica, silica alumina, and gamma alumina are preferred. Composite substrates comprising gamma alumina are more preferred.

The combustion-promoting metal of the process of the present invention can be the types used or generally known in the art to promote the oxidation of carbon monoxide to carbon dioxide in the presence of molecular oxygen. The metal can be in a combined form, such as an oxide, rather than being in the elemental state. The combustion-promoting metal can comprise two or more catalytically-active metals either physically or chemically combined. Suitable combustion-promoting metals for use in the process of the present invention are the transition group elements of the Periodic Table (IUPAC), preferably the Group VIII metals, more preferably the platinum metals, and more preferably yet, platinum. Platinum is preferred by reason of its ability to sustain high activity for oxidation of carbon monoxide.

The percentage of combustion-promoting metal to add to the combustion promoter catalyst used in the present invention is a function of catalyst cost and process effectiveness. The preferred concentration of promoter metal is that which achieves process objectives at minimum catalyst cost. Generally, the combustion-promoting metal is the most costly component of the combustion-promoting catalyst. Higher metal concentrations and lower volume usages reduces the combustion promoter support and catalyst manufacturing costs but can require higher metal amounts due to the potential for reduced mixing within the FBI heat transfer media. Lower metal concentrations and higher volume usages reduce the metal requirements due to better mixing within the heat transfer media, but require additional promoter support and catalyst production costs. Suitable metal concentrations on the combustion promoter catalyst of the present invention can range by weight from about 10 ppm to about 5000 ppm, preferably from about 50 ppm to about 3000 ppm, and more preferably from about 100 to about 2500 ppm for best results. The combustion promoter catalyst metal concentration is based on a platinum level within the heat transfer media of an FBI by weight of from about 0.1 ppm to about 10 ppm, preferably from about 0.5 ppm to about 5 ppm, and more preferably from about 1 to about 3 ppm for best results.

A platinum group component can be incorporated in the support in any suitable manner, such as by coprecipitation or cogellation with the support, ion-exchange, or by impregnation. Preferably, the platinum group component is substantially uniformly dispersed on the support. One preferred method for adding the platinum group component to the support involves the utilization of a water soluble compound of the platinum group component to impregnate the support prior to calcination. For example, platinum may be added to the support by commingling the uncalcined support with an aqueous solution of chloroplatinic acid. Other water soluble compounds of platinum may be employed as impregnation solutions, including for example, ammonium chloroplatinate, platinum chloride, and tetraammineplatinum.

The combustion promoter catalyst used in the present invention should have the proper physcial characteristics for use in fluid bed incineration. The most important physical characteristics in the practice of the present process are particle size and density, Geldart fluidization group, minimum fluidization and entrainment superficial velocities, and mixing characteristics.

Figure 5:
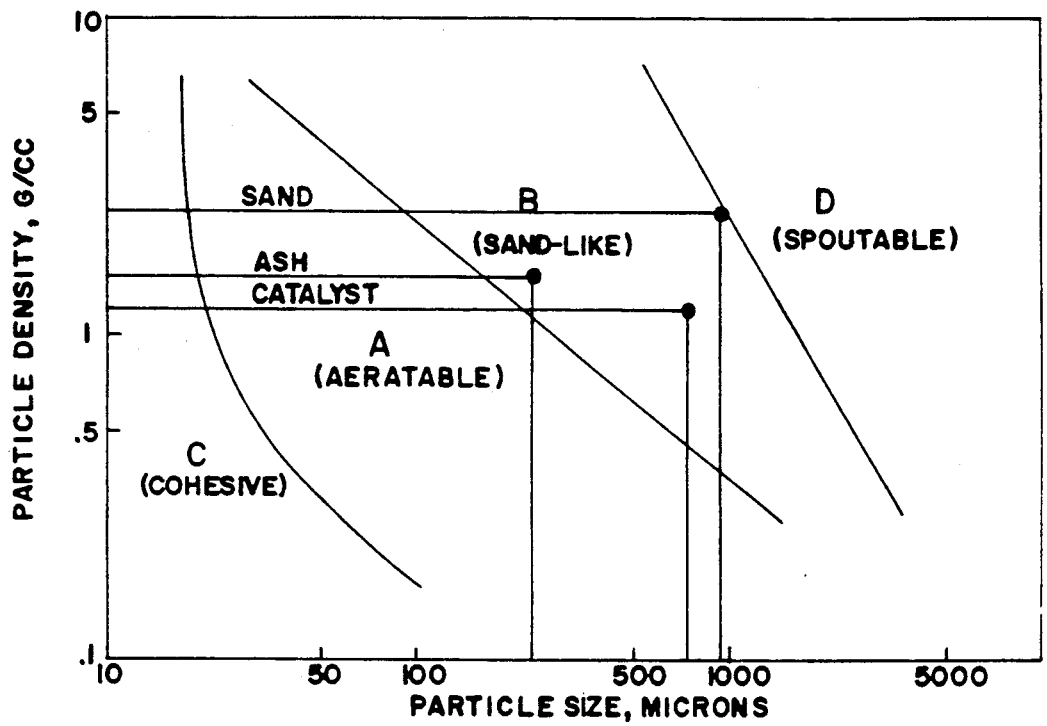
FIG. 5 is a graph illustrating Geldart fluidization group classifications characterized by particle density and particle size.

The fluidization characteristics of particles, classified by size and density, are described by Geldart, D., "Gas Fluidization Technology ", Wiley-Interscience, 1986, the teachings of which are herein incorporated by reference. The Geldart Fluidization Diagram is illustrated in FIG. 5. Group A materials, like fluid catalytic cracking catalyst, are easily circulated; fluidization properties are influenced by interparticle forces; and beds comprising Group A materials collapse slowly when the fluidization gas is shut off. Group B materials, such as silica sand, do not fluidize as easily as Group A materials, have negligible interparticle forces, achieve small bed expansion upon fluidization, and the expanded bed collapses rapidly upon loss of fluidization gas. Group C materials, such as flour and some plastics, are cohesive and fluidization is extremely difficult. Group D materials are subject to poor backmixing, and the particles tend to segregate by size.

The heat transfer media of an FBI can comprise silica sand or chemical pellets and can generally contain ash material produced during the incineration process. The ash particles can have different size and density physical properties than the heat transfer media itself (see FIG.

5) and can, under some operations, comprise from zero percent by weight to as much as 90 percent by weight of an FBI bed. Although ash and silica sand can have different physical properties, they are both Group B materials and behave similarly in fluidization. As a result, Group B and Group A particles, and more preferably Group B particles are preferred for use as the heat transfer media and as the combustion promoter catalyst of the present invention.

The combustion promoter catalyst should be selected with proper fluidization superficial velocity characteristics. Superficial velocity is the volumetric flowrate of a stream per cross-sectional area of the vessel. In an FBI, superficial velocity is a dependent variable subject to the dimensions of the FBI reactor, the amount and characteristics of the feedstock, and the amount of oxygen-containing gas used to combust the feedstock at the given feedstock feedrate. If the superficial velocity in an FBI is higher than the minimum superficial fluidization velocity of the particulate, the particles will fluidize. Smaller particles fluidize at lower superficial fluidization velocities than larger particles, as is illustrated in FIG. 5 which is derived from Geldart (see Geldart, pages 21-24).

The combustion promoter catalyst should also be selected to minimize particle carryover and entrainment into the flue gas. Particulate carryover requires larger particulate recovery systems (e.g., cyclones), reduces particulate recovery system life, results in higher particulate attrition, and often results in greater particulate losses. Particulate entrainment and carry-over generally occurs when the superficial velocity in an FBI reactor exceeds the terminal velocity of a particle. Some carryover is additionally caused by collisions and momentum exchange with the particulate fines being carried over, but this carryover contribution has generally been determined to be minor in a properly designed FBI.

Figure 7:
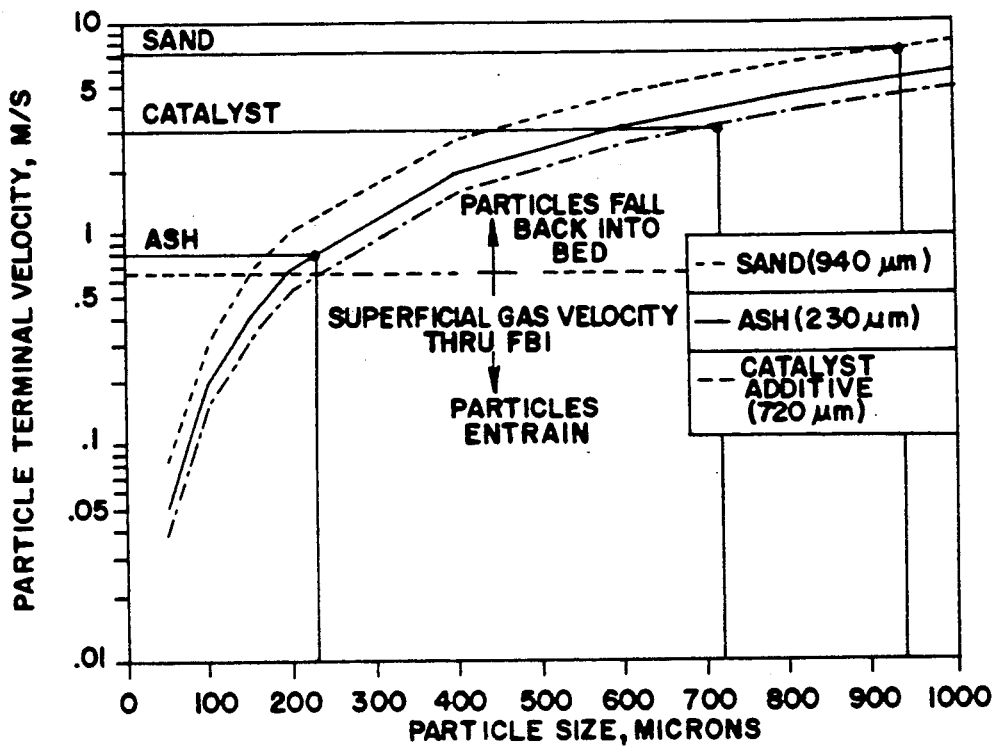
FIG. 7 is a graph illustrating particle entrainment velocity for silica sand, ash, and catalyst particulate as a function of particle size.

Particulate entrainment and carryover is minimized by selecting a combustion promoter catalyst that maximizes the superficial velocity at which particulate entrainment and carryover begins to occur. FIG. 7 provides curves relating particle terminal velocity to particle mass average diameter for typical catalyst, ash, and silica sand particulates (see Example 17). The curves are slightly different for each particle because of differing particle densities. Particle entrainment and carryover is a function of particle size wherein larger particle sizes require higher superficial velocities to entrain and carry-over the particle. As a result, larger particles are preferred over smaller particles to reduce particulate entrainment and carryover. Therefore, the preferred combustion promoter catalyst will have physical properties suitable for ease of fluidization while providing resistance to particulate entrainment and carryover.

For the above reasons, the combustion promoter catalyst particles of the present process and catalyst should substantially exceed 100 microns in particle diameter, preferably 150 microns in particle diameter, and more preferably 200 microns in particle diameter for best results. The combustion promoter catalyst should generally contain at least 80% by weight particles having these properties, preferably at least 90% by weight, and more preferably at least 95% by weight for best results.

The combustion promoter catalyst should be selected to provide suitable mixing characteristics with the components of the heat transfer media which can include sand and ash components. Although a bed of heat transfer media and combustion-promoting catalyst may be well fluidized in the sense that all particles are fully supported by the gas, the bed may still be segregated, in that the local composition of a particular zone does not correspond to the overall average composition in the reactor vessel. Segregation is more likely to occur when the media contains particles of different densities than when the size range is very broad. Nienow, Rowe, and coworkers have investigated segregation by density difference and have proposed a useful correlation for predicting the critical superficial velocity at which mixing takes over from segregation (see Geldart, pages 110-114). The correlation depends on particle density, minimum fluidization velocity, and particle size. The mixing index can be calculated from the critical mixing velocity. The mixing index is an arbitrary scale which varies from 0 (complete horizontal segregation in the bed) to 1 (perfect mixing).

Figure 8:
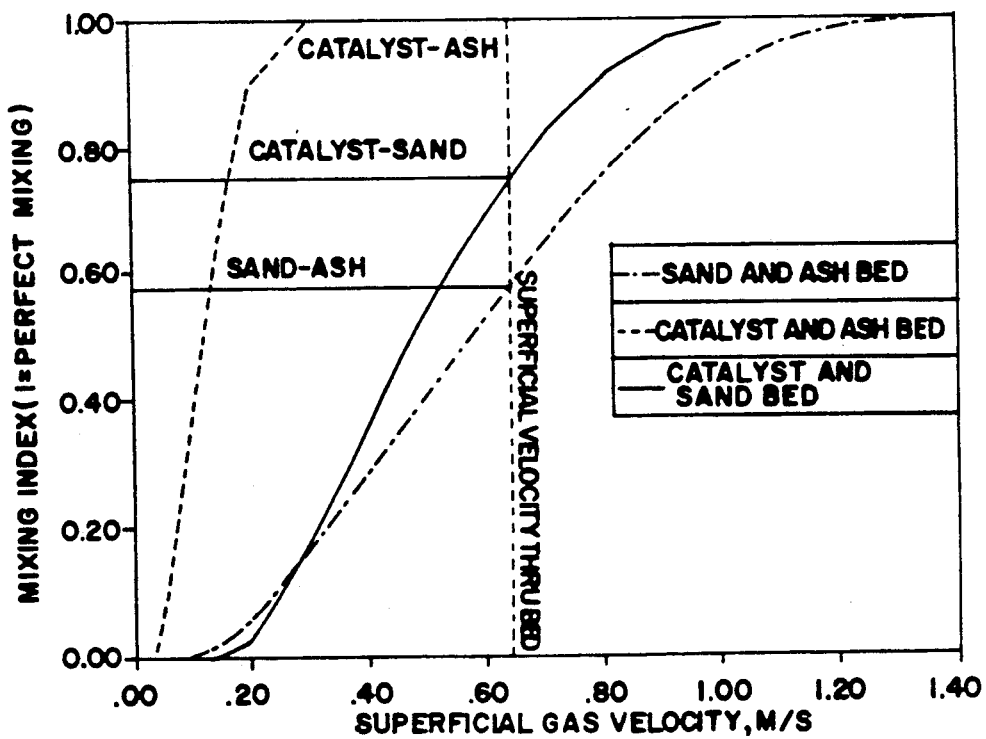
FIG. 8 is a graph illustrating particle mixing index for mixtures of catalyst and ash, catalyst and silica sand, and silica sand and ash as a function of superficial velocity.

FIG. 8 illustrates mixing index curves for typical catalyst, ash, and silica sand particulate as a function of superficial velocity (see Example 18). The catalyst and ash particulates are closely related in density while the catalyst and silica sand particulates are closely related in particulate size. FIG. 8 illustrates that particulate mixtures that are proximate in particulate density provide the best mixing characteristics. For the process of the present invention, it is preferable that the combustion promoter catalyst and heat transfer media particulate (including the ash and the media), have a mixing index of at least 0.3, preferably of at least 0.4, and more preferably of at least 0.5 for best results.

The combustion promoter catalyst and the process mechanics of the FBI should be selected to minimize catalyst and heat transfer media attrition. A catalyst or heat transfer media that undergoes attrition easily increases operational costs by requiring more frequent solids additions and can result in additional particulate fines entering the atmosphere or being recovered for disposal.

Particulate can undergo mechanical or chemical attrition. Most mechanical attrition in an FBI occurs at the combustion gas distributor where a high velocity oxygen-containing gas generally contacts the FBI heat transfer media. It is preferred that combustion gas distribution systems be selected to minimize impinging contact with particulate. Mechanical attrition is also reduced by leaving at least a portion of the ash components in the heat transfer media bed. In comparing ash and a typical heat transfer media component such as silica sand, the ash is softer, can be about four times smaller in mass average diameter, and can be about half as dense, indicating that the ash can provide a cushioning mechanism for a combustion-promoting catalyst. Therefore, some ash within the FBI heat transfer media is preferred over a media consisting largely of a component such as silica sand.

Particulate such as FBI heat transfer media or an FBI combustion, promoting catalyst can also be chemically attrited. When particulate in an onstream FBI is suddenly exposed to large volumes of a water-containing feedstock or when a catalyst in a previously shutdown FBI that has accumulated water is heated up too quickly, water trapped inside the catalyst can quickly vaporize and shatter the catalyst. Support components of the combustion promoter catalyst that are durable and chemical attrition resistant are preferred in the process of the present invention. Similarly, procedural safeguards against the attrition hazards of water during FBI startups and routine operation should be implemented for best results.

The combustion promoter catalyst generally will not deactivate from exposure to most FBI feedstocks. FBI feedstocks having sludge as an ingredient may also contain a variety of metal components (see Table 1) that can reduce the effectiveness of some catalytic processes. However, exposure of the catalyst used in the present process to feedstocks having metal-containing sludges generally does not deactivate the catalyst. In many cases, carbon monoxide oxidation performance improves with sludge addition since the sludge can possess additional combustion-promoting metals. Therefore, catalyst deactivation from sludges and metals containing feedstocks generally does not adversely effect the process of the present invention.

Typical FBI facilities have process sections including feedstock preparation facilities, a reaction section, flue gas handling facilities, and solids handling facilities. The feed preparation facilities can extend upstream in the processing scheme to include skimming devices on air flotation equipment, separator devices, and other reclamation operations where the waste feedstock is recovered. Waste streams are generally gathered from these devices in an accumulator for further feedstock preparation. The feedstock preparation facilities can have a preliminary water separation device which can be a vessel having weirs designed to separate and remove water from FBI feedstock by gravity differences. A similar separation can be achieved with a storage tank having water drawing facilities. Still another mechanism for reducing the level of water in sludge is through belt filter presses which mechanically assist in the water separation process. The water separation process is often assisted by addition of dewatering additives that can facilitate water/feedstock separation. Excessive water quantities should be removed from the FBI feedstock before proceeding to the FBI for best results.

The reaction section of an FBI generally includes a reaction vessel wherein the combustion reaction takes place. The reaction vessel includes a bed of inert heat transfer media which can comprise silica sand, chemical pellets, or other suitable materials for providing the function of absorbing heat from the combustion reaction and transferring the heat to the feedstock. The heat transfer media generally will accumulate ash components produced during the combustion reaction. The combustion promoter catalyst of the process of the present invention is added to the reactor vessel and disperses with the heat transfer media and ash component. It is important that the combustion-promoting catalyst have the proper physical characteristics for use in fluid bed incineration. The most important physical characteristics are those of particle size and density, Geldart fluidization group, fluidization superficial velocity properties, and mixing capability.

Combustion gas injection coils are generally designed below the heat transfer media bed for providing an oxygen-containing combustion stream (generally air) for the incineration reaction and for fluidizing the media, ash, and combustion promoter catalyst. Fluidization increases the particulate heat transfer and combustion promoter catalyst surface area available for contact with the feedstock. The air injection coils can be in a ring form or any suitable design to provide an even distribution of air flow across the bed.

The reactor vessel is also generally equipped with feedstock injection nozzles which are designed to introduce feedstock to the FBI. The nozzles can be equipped with an atomizing stream to reduce the particle size of the feedstock upon entry into the incinerator. Atomization promotes quicker and more complete combustion of the feedstock. A suitable atomization stream is steam. The reactor vessel may also be equipped with fuel injection nozzles. The fuel injection nozzles are provided for conditions where the heat released from combustion of the feedstock is insufficient to vaporize the water component in the feed and the temperature necessary to maintain proper combustion conversion cannot be maintained. The fuel flow to the injection nozzles can often be controlled, through use of suitable instrumentation, by the temperature of the FBI flue gas. The fuel nozzles can also be atomized with an atomization stream such as steam. The fuel injection into reactor vessel can also be injected into the feedstock prior to entry into the reactor vessel. In these designs, a fuel injection nozzle projected directly into the reactor vessel may not be required for routine operations.

The reactor vessel is also generally equipped with a particulate removal system which can include cyclones to remove particulates from the flue gas prior to exiting the reactor vessel. FBI cyclone systems are often designed to substantially recover particulates of greater than a minimum particle size. A suitable minimum particle size for cyclone design can range from about 1 micron to about 50 microns but will generally range from about 2 microns to about 20 microns. These particles exiting the cyclones drop downwardly through cyclone diplegs and can be returned to the heat transfer media bed or can be dropped to a particular storage device, often for disposal. The particulate removal system operates to reduce the particle size of materials exiting the reactor vessel with the flue gas to very small particulate diameters.

The flue gas handling system generally operates with the objective of recovering waste heat from the flue gas and utilizing the waste heat for the production of steam or electricity or for transfer back to the process. Moreover, the flue gas handling system operates to further remove small particulate from the flue gas before discharging the gas to the atmosphere. These handling facilities often begin with a waste heat recovery unit. The waste heat recovery unit can be an air preheater which is often designed to transfer heat to the combustion air or oxygen-containing gas stream used in the combustion process from the flue gas exiting the reactor vessel. The waste heat recovery unit can also be a facility where the heat supplied by the flue gas is used to generate steam or electricity.

A second objective of the flue gas handling system is to further remove small particulates from the FBI flue gas that escape the cyclone particulate removal system. This can be done through use of a bag house. However, bag houses do not operate as effectively in FBI operations where the feedstock has a high water content. High water content flue gases can result in bag house pluggage, lower operating factors, and high maintenance costs. Another means of recovering small particulate from flue gas is through a scrubber mechanism. In scrubber systems, the flue gas can be induced through a Venturi mechanism by steam ejectors, and the steam and flue gas condensed in a vented barometric condenser. Condensation cooling can be provided by conventional heat exchanger means or by direct contact with a suitable cooling stream such as water. The noncondensibles are vented to the atmosphere while the small particulates generally remain with the condensate (and barometric water if applicable) phase. The small particulates can be recovered from the condensate phase through use of settling vessels with or without addition of conventional anti-floculent chemicals, and the water can be removed for further purification.

The solids handling facilities function to permit solids addition and removal to and from various locations on the process. Additions are generally performed to restore attrited solids levels and supplement the heat transfer media with the combustion promoter catalyst of the process of the present invention. Solids additions are generally performed by gravity flow from supply bins located above the elevation of the process injection point. Particulate can be staged to the bins by elevators or by other suitable means. The process can have solids addition points at the reactor bed, at the inlet to the supply bins, and at the inlet to the solids elevators. Solids removal is performed to selectively remove solids from the process where the operator may want to lower the overall solids level or lower the concentration of a particularly sized solid. Solids removal is also performed by gravity flow. The process can have solids removal points at the FBI bed and the reactor vessel cyclone diplegs. The cyclone dipleg removal point will permit selective removal of smaller sized particulate.

The fluid bed incineration process of the present invention generally begins with the accumulation of an FBI feedstock and preliminary feedstock preparation steps such as gross dewatering. The feedstock is injected into a reaction vessel containing a fluidized heat transfer media commingled with a combustion-promoting catalyst with particular physical characteristics, in the presence of an oxygen-containing stream having oxygen in excess of that necessary for complete conversion of carbon monoxide to carbon dioxide. The catalyst entrained in the flue gas produced in the combustion reaction is separated from the flue gas in a particulate recovery system and returned to the heat transfer media. The flue gas leaving the reactor is cooled in a waste heat recovery facility, smaller catalyst fines are further removed from the flue gas, and the flue gas is discharged to the atmosphere.

One important process variable in an FBI operation is combustion temperature. Combustion temperature is maintained at sufficiently high temperatures to ensure environmentally safe carbon monoxide conversion levels. These temperatures are often in excess of 1200° F. The FBI of the present invention should be operated to emit a substantially carbon monoxide-free flue gas to the atmosphere. FBI carbon monoxide emissions levels in the vented flue gas should be maintained below 500 ppm by weight, preferably below 250 ppm by weight, and more preferably below 100 ppm by weight. The process of the present invention can be operated to attain levels of 10 ppm by weight or lower of carbon monoxide in the vented flue gas.

While high combustion temperatures promote carbon monoxide conversion, they adversely increase the level of metals emitted to the atmosphere. Elevated operating temperatures result in higher metals emissions since they promote higher levels of metal vaporization into the flue gas. Moreover, higher temperatures result in higher reactor superficial velocities, additional entrained particulate, and the potential for particulate breaking through the cyclone particulate removal systems which can result in higher metal levels entering the atmosphere. The process of the present invention permits attaining of high carbon monoxide conversion levels while minimizing operating temperature so as to also reduce metals emissions to the atmosphere.

Lower maintenance costs and higher operating factors are an attendant benefit to operating an FBI at lower temperatures. Higher temperature operations create higher reactor vessel superficial velocities, creating additional solids internal abrasion. Higher temperature operations typically require greater thicknesses of higher cost refractory in addition the costs of increasing the refractory wear resistance. FBIs that operate at higher temperatures generally incur more frequent FBI shutdowns and longer and more costly repairs.

Solids physical characteristics is another process parameter which should be controlled to achieve the objectives of the process of the present invention. The combustion promoter catalyst should conform to the requirements of particle size and density, Geldart fluidization properties, fluidization superficial velocity properties, and mixing characteristics described above. For example, addition of a combustion-promoting catalyst having a substantial portion of particles below 100 microns added to a heat transfer media with generally different physical properties would not operate as effectively as the process of the present invention.

The present invention is described in further detail in connection with the following examples, it being understood that the same are for purposes of illustration only and not limitation.

EXAMPLE 1

A combustion promoter catalyst was prepared by dispersing gamma alumina (Versal GH alumina-manufactured by La Roche Chemicals in distilled water and nitric acid and forming a solution with a pH of 3. The dispersion was used to impregnate low surface area alpha alumina (Fluidizable Low Surface Area Alumina-Product 6595 -manufactured by Norton), and the resulting coated substrate was dried over night at 250° F. The coated substrate was then sieved to remove particles less than 325 mesh (44 microns). The coated substrate had a surface area of 28 $m^2/g$. The coated substrate was impregnated with chloroplatinic acid, dried, and calcined at 1000° F. providing a combustion promoter catalyst with 2000 ppm platinum.

EXAMPLE 2

Spent fluid bed incinerator media was obtained from a fluid bed incinerator located at the Amoco Oil Whiting Refinery in Whiting, Ind. The material was sieved into several fractions, and each fraction was analyzed for density using mercury porosimetry. The results are illustrated in FIG. 1.

The size distribution is bimodal and reflects a media containing silica sand and ash. The smaller mode density, which is attributed to the ash fraction, is nearly constant at 1.5 g/cm, and the larger mode, which is attributed to silica sand, has a density of about 2.4 g/cm. The mass average diameters of the sand and ash fractions were found to be 940 microns and 230 microns, respectively. The Geldart fluidization characteristics placed the catalyst as a Group B material (see FIG. 5). The silica sand made up about 30 percent by weight of the media.

EXAMPLE 3

Figure 2:
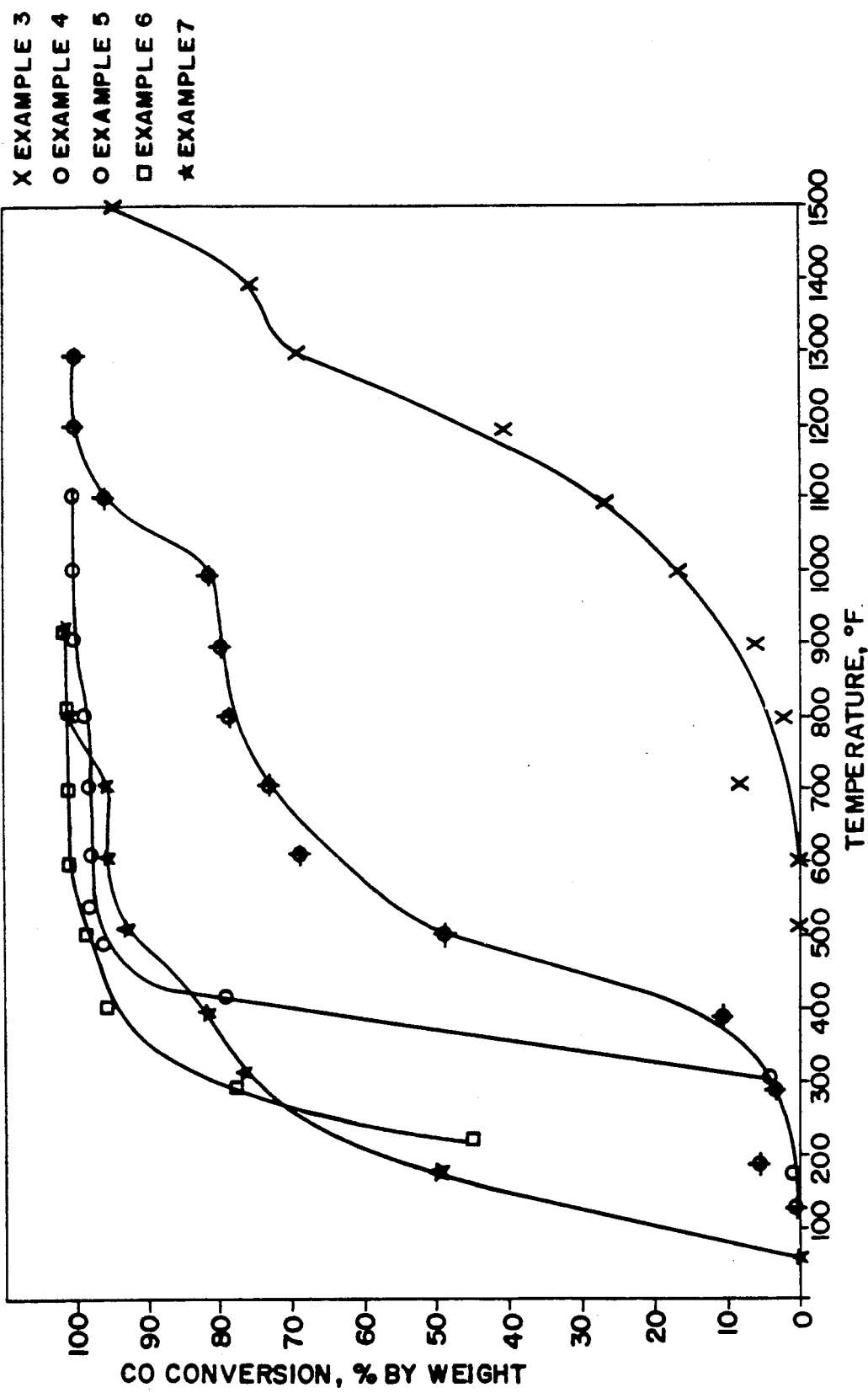
FIG. 2 is a graph illustrating the carbon monoxide oxidation curves for several combinations of combustion promoter catalyst and heat transfer media.

Fresh silica sand having a mode density of about 2.3 g/cm, a mass average diameter of 790 microns, and a size range of from 710 microns to 850 microns was tested for its ability to oxidize carbon monoxide. The tests were done with 25 gm of catalyst in a 23 mm ID quartz tube with a total flow of 150 ml/min of gas. The composition of the gas was 505 ppm carbon monoxide, 15 percent by volume oxygen, and the balance nitrogen. The weight percent conversion of carbon monoxide to carbon dioxide was measured from room temperature to 1500° F. The results are illustrated in FIG. 2.

The FBI process using fresh silica sand does not enhance the oxidation of carbon monoxide to carbon dioxide.

EXAMPLE 4

The spent fluid bed incinerator media of Example 2 was tested for its ability to oxidize carbon monoxide using the testing technique of Example 3. The results are illustrated in FIG. 2.

The FBI process using the spent fluid bed incinerator media of Example 2 provides better oxidation characteristics than the process using fresh silica media since the spent media contains metal deposits from contact with FBI feedstocks that can assist in carbon monoxide oxidation to carbon dioxide.

EXAMPLE 5

The catalyst of Example 1 was added to the fresh silica sand described in Example 3 such that the bed contained 2 ppm by weight of platinum in silica sand. The bed was subjected to the testing technique of Example 3. The results are illustrated in FIG. 2.

The FBI process using the combustion promoted silica sand of Example 5 provides 95 percent by weight carbon monoxide conversion at a 1000° F. lower temperature than the process using the fresh silica sand alone of Example 3.

EXAMPLE 6

The catalyst of Example 1 was added to the spent fluid bed incinerator media of Example 2 such that the bed contained 2 ppm by weight of platinum in silica sand. The mixture of spent media and catalyst was steamed at 1400° F. for 5 hrs to simulate FBI reactor conditions. The bed was subjected to the testing technique of Example 3. The results are illustrated in FIG. 2.

The FBI process using the combustion promoted spent fluid bed incinerator media of Example 6 provides 95 percent by weight carbon monoxide conversion at a 700° F. lower temperature than the process using the spent fluid bed incinerator media alone of Example 4.

EXAMPLE 7

The mixture of spent media and catalyst of Example 6 was steamed at 1400° F. for 66 hrs to simulate more severe FBI reactor conditions. The bed was subjected to the testing technique of Example 3. The results are illustrated in FIG. 2.

The FBI process using the combustion promoted spent fluid bed incinerator media of Example 7 provides 95 percent by weight carbon monoxide conversion at a 400° F. lower temperature than the process using the spent fluid bed incinerator media alone of Example 4. The FBI process using the sample of catalyst and media of Example 7, steamed for 66 hrs instead of the 5-hour steaming of the process of Example 6 provided better carbon monoxide conversion performance below a level of 72 percent by weight conversion and worse performance as conversion increased beyond 72 percent by weight.

EXAMPLE 8

A combustion promoter catalyst was prepared by impregnating gamma alumina (Intercat) with chloroplatinic acid to form a combustion promoter catalyst having 100 ppm of platinum. The mass average diameter of the combustion promoter catalyst ranged from 460 microns to 1400 microns. The catalyst was added to a bed of the fresh silica sand described in Example 3 above to form a bed with a platinum concentration of 2 ppm by weight.

Figure 3:
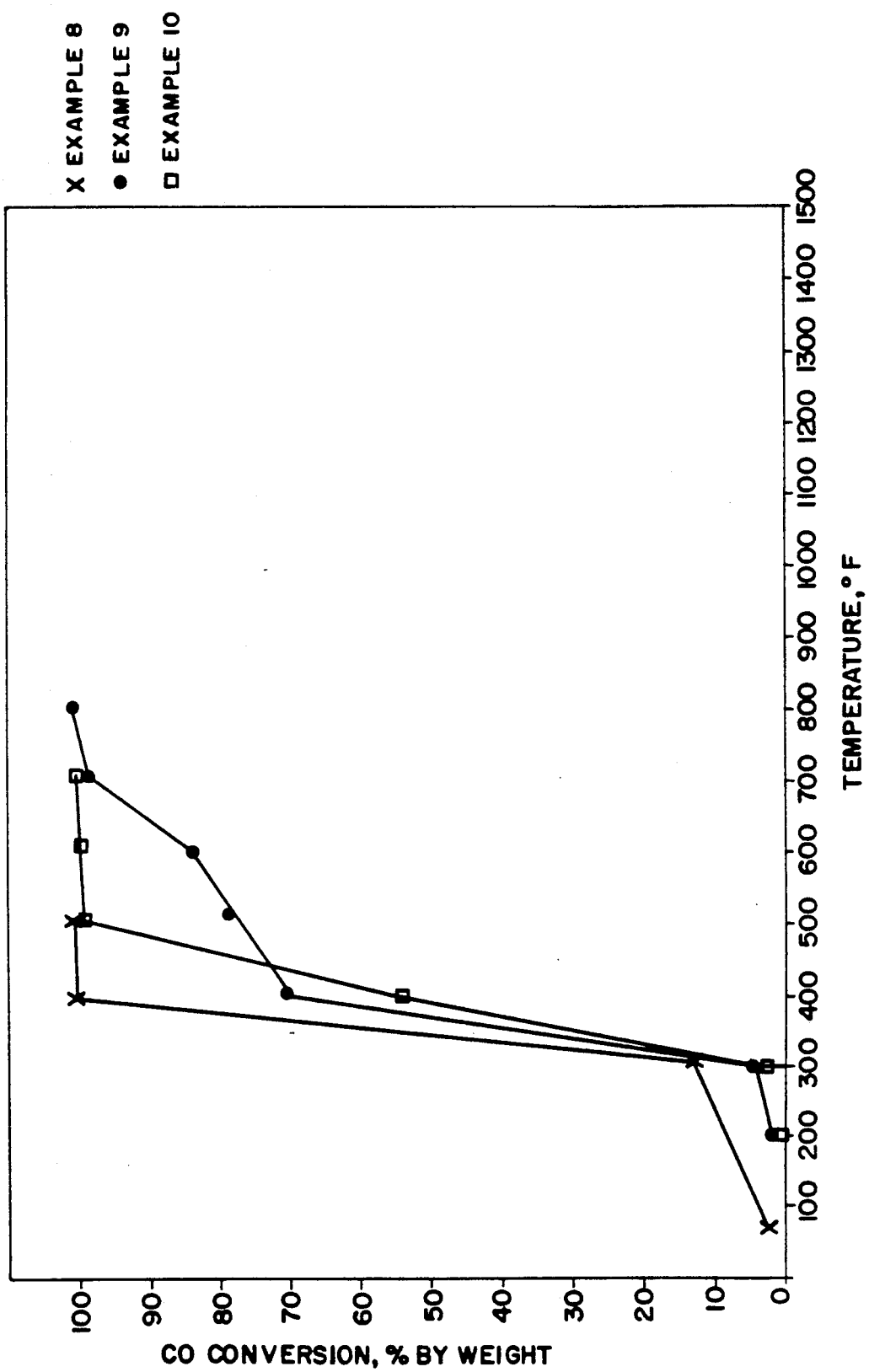
FIG. 3 is a graph comparing combustion-promoting catalysts with several support components.

The catalyst was subjected to the testing technique of Example 3. The results are illustrated in FIG. 3.

EXAMPLE 9

A combustion promoter catalyst was prepared by impregnating alpha alumina (Norton) with chloroplatinic acid to form a combustion promoter catalyst having 100 ppm of platinum. The mass average diameter of the combustion promoter catalyst ranged from 500 microns to 1000 microns. The catalyst was added to a bed of the fresh silica sand described in Example 3 above to form a bed with a platinum concentration of 2 ppm by weight.

The catalyst was subjected to the testing technique of Example 3. The results are illustrated in FIG. 3.

The FBI process using the combustion promoter catalyst of Example 9 having alpha alumina, provided inferior performance to the process using the combustion promoter catalyst of Example 8 having gamma alumina, across all ranges of carbon monoxide conversion.

EXAMPLE 10

A combustion promoter catalyst was prepared by coating the alpha alumina of Example 9 with the gamma alumina of Example 1, using the procedure described in Example 1, and impregnating the coated substrate with chloroplatinic acid to form a catalyst having 100 ppm of platinum. The mass average diameter of the combustion promoter catalyst ranged from 500 microns to 1000 microns. The catalyst was added to a bed of the fresh silica sand described in Example 3 above to form a bed with a platinum concentration of 2 ppm by weight.

Figure 4:
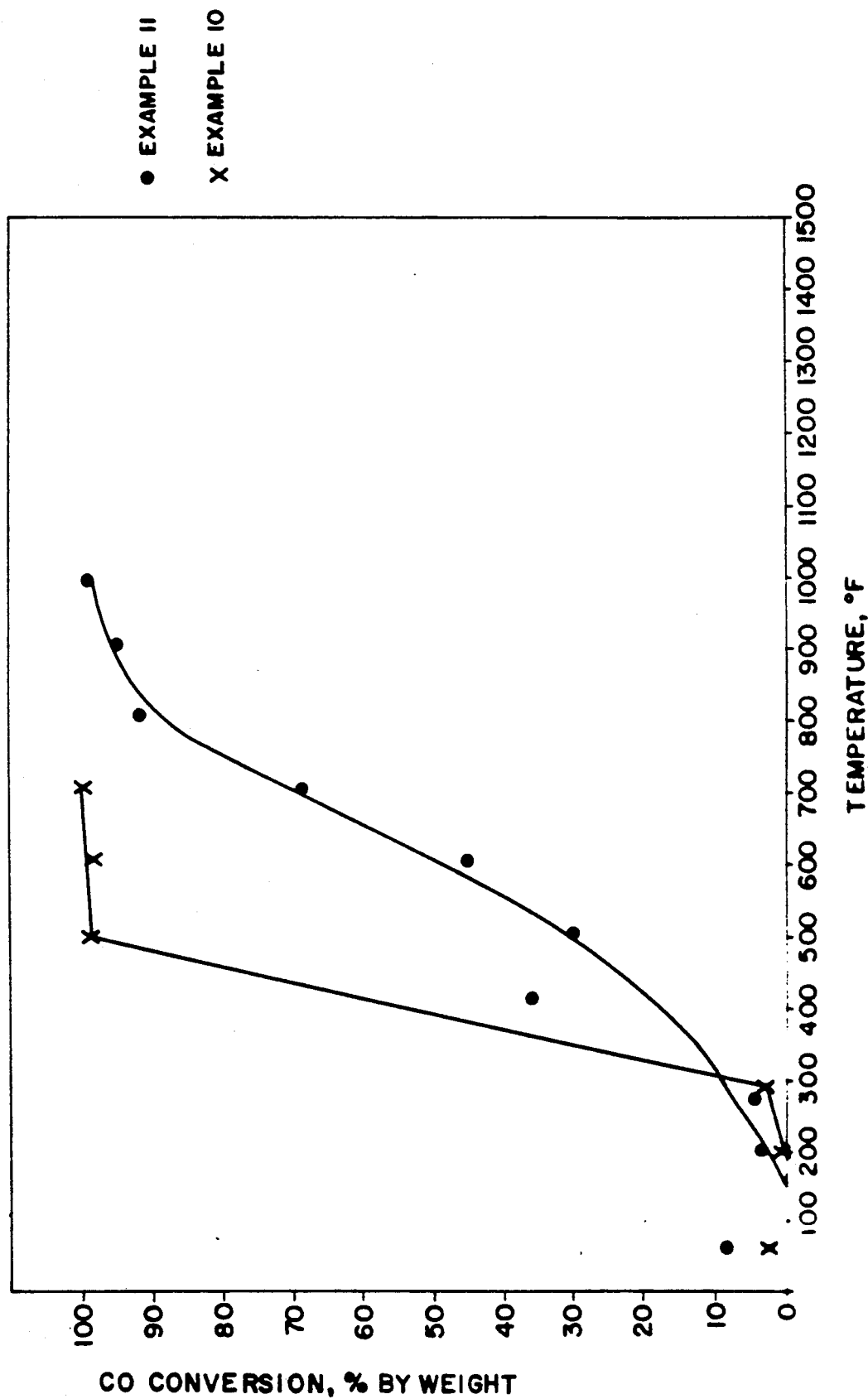
FIG. 4 is a graph comparing equivalent platinum FBI bed loadings using a high platinum concentration and a lower platinum concentration combustion promoter catalyst.

The catalyst was subjected to the testing technique of Example 3. The results are illustrated in FIGS. 3 and 4.

The FBI process using the combustion promoter catalyst of Example 10, having alpha alumina impregnated with gamma alumina, provided inferior performance to the process using the combustion promoter catalyst of Example 8 having gamma alumina across all ranges of carbon monoxide conversion. The process using the catalyst of Example 10 provided comparable performance to the process using the catalyst of Example 9 having alpha alumina below 72 percent by weight carbon monoxide conversion and superior performance above 72 percent by weight carbon monoxide conversion.

EXAMPLE 11

A combustion promoter catalyst similar to the catalyst of Example 10 was prepared but for impregnation of the coated substrate with chloroplatinic acid to form a catalyst having 2000 ppm platinum. The catalyst was similarly added to a bed of the fresh silica sand described in Example 3 above to form a bed with a platinum concentration of 2 ppm by weight.

The catalyst was subjected to the testing technique of Example 3. The results are illustrated in FIG. 4.

FIG. 4 illustrates that lower platinum levels on the combustion promoter catalyst at similar platinum concentrations in the bed (i.e., higher concentrations of catalyst in the fresh silica sand) provides better carbon monoxide conversion. This is largely due to better platinum dispersion in the bed.

EXAMPLE 12

A catalyst was prepared for testing catalyst attrition resistance by sieving a sample of gamma alumina (Intercat) particles into fractions. The catalyst consisted of gamma alumina particles with a mass average size of 720 microns, a size range of from 710 microns to 850 microns, and a particle density of 1.2 g/cm. The Geldart fluidization characteristics placed the catalyst as a group B material (see FIG. 5). The catalyst was spherical with a sphericity factor of unity.

EXAMPLE 13

A mechanical attrition test was conducted in a 4-inch ID plexiglas model fluid bed incinerator. The catalyst of Example 12 was added to the spent fluid bed incinerator media of Example 2 such that the mixture of catalyst and media was 1 percent by weight catalyst. The mixture was fluidized by air at ambient conditions for 7 days. The superficial velocity of the air in the model was maintained at 0.7 m/sec to simulate typical fluid bed incinerator conditions. The gas velocity across the air distributor openings was maintained at 3.2 m/sec to simulate typical fluid bed incinerator conditions. The gamma alumina catalyst proved to be highly attrition resistant producing less than 1 percent by weight fines below 425 microns.

EXAMPLE 14

A mechanical attrition test was conducted in a 1-inch ID glass tube at similar conditions to those in Example 13. The catalyst of Example 12 was added to a bed of the silica sand described in Example 3 such that the mixture of catalyst and silica sand was 4 percent by weight catalyst. After 24 hours, the catalyst produced about 10 percent fines indicating that the ash in the fluid bed incinerator media favorably lowers the catalyst attrition rate. This is likely a result of the cushioning effect of the ash.

EXAMPLE 15

A chemical attrition test was conducted on the catalyst of Example 12 to simulate contact of the combustion promoter catalyst in an FBI with steam. The catalyst was impregnated with water and dropped onto a hot plate in a furnace at 1500° F. The catalyst remained intact and did not shatter.

EXAMPLE 16

Figure 6:
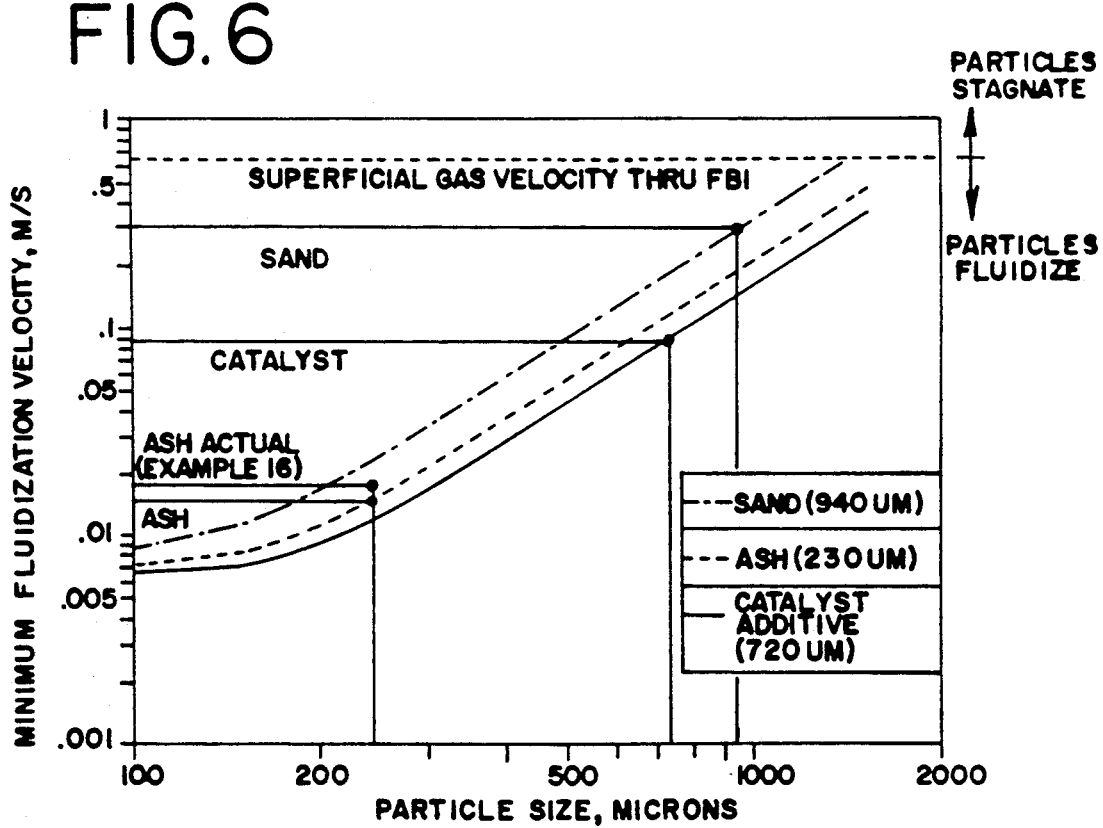
FIG. 6 is a graph illustrating the minimum fluidization velocity for silica sand, ash, and catalyst particulate as a function of particle size.

The minimum fluidization superficial velocity was determined in the 4-inch ID plexiglas fluid bed incinerator model. The catalyst of Example 12 was added to the spent fluid bed incinerator media of Example 2 such that the mixture of catalyst and media was 1 percent by weight catalyst. In the plexiglas column, bubbles began to form at a 0.018 m/sec superficial velocity and were discernibly produced at a superficial velocity of 0.025 m/sec. The bubble formation reflected fluidization of the ash component of the mixture since the ash particles have the smallest particle size and are first to fluidize. FIG. 6 illustrates the predicted minimum superficial fluidization velocities of the ash, catalyst, and silica sand components of the mixture as predicted by Geldart (see Geldart, pages 21–24) and the actual ash minimum superficial fluidization velocity data point.

EXAMPLE 17

The minimum particle entrainment velocity was using Geldart (see Geldart, pages 123–153) for the catalyst of Example 12, ash (1.5 g/cm, 230 micron mass average diameter), and the silica sand of Example 3. The findings are illustrated in FIG. 7.

FIG. 7 provides curves for the catalyst, ash, and silica sand, each differing slightly because of their particle density differences. FIG. 7 also illustrates that the terminal velocity for ash is lower than that of the catalyst and the sand due to its particle size and would entrain first in a mixture of the three particulate components upon FBI superficial velocity exceeding the terminal velocity of the ash. FIG. 7 also illustrates the benefits of selecting a combustion promoter catalyst with larger particle size than the ash.

EXAMPLE 18

The mixing index for binary mixtures of the catalyst of Example 12 and ash (1.5 g/cm, 230 micron mass average diameter), ash and the silica sand of Example 3, and the catalyst and the silica sand were predicted for varying levels of superficial velocity. The mixing index correlation is by Nienow, Rowe, and coworkers and reported in Geldart (see Geldart, pages 110–114). The findings are illustrated in FIG. 8.

FIG. 8 illustrates that the catalyst/ash mixture provides the best mixing, followed by the catalyst/silica sand mixture, and lastly by the silica sand/ash mixture. FIG. 8 further illustrates that the degree of mixing is largely a function of the relative similarities in particle density.

EXAMPLE 19

Catalyst and FBI media mixing was tested in the 4-inch ID plexiglas fluid bed incinerator model. The catalyst of Example 12, which was white in color, was placed on top of the fluid bed incinerator media of Example 2, which was rust in color, without any air flow. The air flow was added and increased to typical fluid bed incinerator superficial gas velocities of about 0.65 m/sec. The catalyst was quickly dispersed in the bed. There were short periods of time where pockets of the bed were not circulated but overall, the catalyst was welldispersed in the media.

EXAMPLE 20

A base case for catalyst deactivation tests was developed by adding a catalyst consisting of gamma alumina (Intercat), absent a promoter metal to the pilot plant of Example 3. The catalyst was subjected to the gas of Example 3, and the percent by weight carbon monoxide conversion was measured from room temperature to 1300° F. The results are illustrated in FIG. 9.

EXAMPLE 21

A second base case for catalyst deactivation tests was developed by adding a catalyst consisting of gamma alumina (Condea/Intercat) impregnated with 200 ppm of platinum to the pilot plant of Example 3. The catalyst was subjected to the gas of Example 3, and the percent by weight carbon monoxide conversion was measured from room temperature to 1300° F. The results are illustrated in FIG. 9.

FIG. 9 illustrates that the fresh platinum impregnated gamma alumina catalyst of Example 21 performs better than the gamma alumina without platinum impregnation.

EXAMPLE 22

Catalyst deactivation from contact with FBI sludges was measured for the combustion promoter catalyst of Example 21. A mixture of 20 gm of catalyst and 20 gm of a typical FBI sludge feedstock having the components described in Table 1 was prepared and dried at 250° F. for a period of 2 hrs to remove volatile components. The catalyst and sludge mixture was further heat dried in a combustion tube at 1250° F. for 1 hr in the presence of air flowing at 100 cc/min. The catalyst and sludge deposits were added to the pilot plant described in Example 3. The gas of Example 3 was added to the pilot plant containing the catalyst and sludge deposits and the percent by weight carbon monoxide conversion was measured from room temperature to 1300° F. The results are illustrated in FIG. 9.

FIG. 9 illustrates that the catalyst does not deactivate in the presence of typical FBI sludge. In fact, carbon monoxide conversion is improved as compared to the fresh catalyst of Example 21, due to the presence of additional promoting metals present in the sludge deposits.

TABLE 1

| FBI Sludge Feedstock | |
| --- | --- |
| Component | ppm by weight |
| Zn | 1250 |
| Mn | 23 |
| Pb | 18800 |
| Cr | 410 |
| Fe | 2040 |
| Ni | 18 |
| V | 22 |
| Cu | 228 |
| Co | 4 |
| Na | 4900 |
| K | 359 |
| Ca | 730 |
| Mo | 157 |
| Mg | 1480 |
| Al | 450000 |
| Ti | 45 |
| P | 1740 |
| Sr | 62 |

EXAMPLE 23

Catalyst deactivation from contact with FBI sludges was measured for the combustion promoter catalyst and sludge deposits of Example 22 adding a catalyst steaming step to simulate the adverse conditions experienced in an FBI. After the heat drying step of Example 22, the catalyst and sludge deposits were steamed at 1250° F. for 1 hr with steam. The gas of Example 3 was added to the pilot plant containing the steamed catalyst and the sludge deposits, and the percent by weight carbon monoxide conversion was measured from room temperature to 1300° F. The results are illustrated in FIG. 9.

FIG. 9 illustrates that the catalyst is not adversely affected or deactivated by the presence of steam in an FBI. In fact, carbon monoxide conversion is improved as compared to the non-steamed catalyst of Example 22.

EXAMPLE 24

A fluid catalytic cracking combustion promoter catalyst having Group A Geldart fluidization characteristics and substantially consisting of particles of less than 100 microns in mass average diameter was added to a commercial fluid bed incinerator facility at the Amoco Oil Whiting Refinery in Whiting, Indiana. The combustion promoter catalyst was CCA-8 CO promoter manufactured by Amber Chemicals.

The FCC promoter catalyst was added directly to the FBI reactor bed in an amount to achieve a platinum concentration of 0.3 ppm by weight in the bed. The carbon monoxide level in the FBI flue gas prior to introduction of FCC promoter catalyst was 40 ppm weight at an FBI reactor vessel bed temperature of 1280° F. No noticeable reduction in flue gas carbon monoxide level was observed.

The carbon monoxide level in the FBI flue gas was increased to 190 ppm by weight by the addition of fuel oil to the FBI feed. The FBI bed temperature remained at 1280° F. Additional FCC promoter catalyst was added to the reactor vessel bed of the FBI to achieve a platinum concentration in the bed of 1 ppm by weight. No noticeable reduction in flue gas carbon monoxide level was observed.

This test illustrates that FCC promoter catalyst and catalysts with similar physical properties to FCC promoter catalysts are not suitable for use in fluid bed incineration.

That which is claimed is:

1. A process for the fluid bed incineration of a combustible hydrocarbon feedstock comprising:
   contacting said feedstock with a mixture of a fluidized heat transfer media and a combustion promoter catalyst, in the presence of an oxygen-containing gas stream in excess of that required for complete combustion of the carbon monoxide formed, at feedstock combustion conditions, said combustion promoter catalyst consisting essentially of particulate with a particle size of greater than 100 microns and comprising a promoter metal present in an amount to provide an effluent flue gas with less than 500 ppm by weight carbon monoxide.

2. The process of claim 1 wherein the feedstock comprises at least one member selected from the group consisting of refinery and petrochemical byproducts and refinery and petrochemical wastes.

3. The process of claim 1 wherein said combustion promoter catalyst comprises a promoter support component having at least one member selected from the group consisting of mullite, spinel, alpha alumina, gamma alumina, delta alumina, eta alumina, silica, alumina, silica alumina, titania, zirconia, and sand.

4. The process of claim 1 wherein said combustion promoter catalyst comprises a promoter support component having a substrate and a substrate coating, said substrate comprising at least one member selected from the group consisting of mullite, spinel, alpha alumina, and sand.

5. The process of claim 4 wherein said substrae coating comprises at least one member selected from the group consisting of silica, alumina, titania, silica alumina, zirconia, gamma alumina, delta alumina, and eta alumina.

6. The process of claim 1 wherein said promoter metal comprises from about 0.1 ppm by weight to about 10 ppm by weight of said mixture.

7. The process of claim 1 wherein said promoter metal comprises from about 10 ppm by weight to about 5000 ppm by weight of said combustion promoter catalyst.

8. A process for the fluid bed incineration of a combustible hydrocarbon feedstock comprising:
contacting said feedstock with a mixture of a fluidized heat transfer media and a combustion promoter catalyst, in the presene of an oxygen-containing gas stream in excess of that required for complete combustion of the carbon monoxide formed, at feedstock combustion conditions, said combustion promoter catalyst consisting essentially of particulate with a particle size of greater than 150 microns and comprising a Platinum Group promoter metal and a promoter support comprising at least one member selected from the group consisting of mullite, spinel, alpha alumina, gamma alumina, delta alumina, eta alumina, silica, alumina, silica alumina, titania, zirconia, and sand, said combustion promoter catalyst present in an amount to provide an effluent flue gas with less than 250 ppm by weight carbon monoxide.

9. The process of claim 8 wherein said fluidized heat transfer media comprises silica sand.

10. The process of claim 9 wherein said fluidized heat transfer media and said combustion promoter catalyst have Group B Geldart fluidization characteristics.

11. The process of claim 8 wherein said feedstock comprises at least one member selected from the group consisting of refinery and petrochemical byproducts and refinery and petrochemical wastes.

12. The process of claim 8 wherein said promoter support comprises at least one member selected from the group consisting of alpha alumina, gamma alumina, silica alumina, and silica.

13. The process of claim 8 wherein said promoter support comprises a substrate and a substrate coating wherein said substrate comprises at least one member selected from the group consisting of mullite, spinel, alpha alumina, and sand.

14. The process of claim 13 wherein said substrate coating comprises at least one member selected from the group consisting of silica, silica alumina, and gamma alumina.

15. The process of claim 8 wherein the surface area of said promoter support is from about 50 m$^2$/gm to about 200 m$^2$/gm.

16. The process of claim 8 wherein said promoter metal comprises from about 0.5 ppm by weight to about 5 ppm by weight of said mixture.

17. The process of claim 8 wherein said promoter metal comprises from about 50 ppm by weight to about 3000 ppm by weight of said combustion promoter catalyst.

18. A process for the fluid bed incineration of a combustible hydrocarbon feedstock comprising:
contacting said feedstock with a mixture of a fluidized inert heat transfer media and a combustion promoter catalyst in a fluid bed incinerator reactor, in the presence of an oxygen-containing gas stream in excess of that required for complete combustion of the carbon monoxide formed, at feedstock combustion conditions, said combustion promoter catalyst consisting essentially of particulate with a particle size of greater than 200 microns and comprising a promoter metal selected from the group consisting of platinum and palladium and a promoter support comprising at least one member selected from the group consisting of alpha alumina and gamma alumina, said combustion promoter catalyst present in an amount to provide an effluent flue gas with less than 100 ppm by weight carbon monoxide.

19. The process of claim 18 wherein said feedstock comprises at least one member selected from the group consisting of refinery and petrochemical byproducts and wastes.

20. The process of claim 19 wherein said feedstock is directed to a water separation device prior to said contacting and heat is transferred from said effluent flue gas to said oxygen-containing gas stream external to said fluid bed incinerator reactor.

21. The process of claim 18 wherein said fluidized inert heat transfer media is silica sand.

22. The process of claim 21 wherein said fluidized heat transfer media and said combustion promoter catalyst have Group B Geldart fluidization characteristics.

23. The process of claim 18 wherein the surface area of said promoter support is from about 80 m$^2$/gm to about 150 m$^2$/gm.

24. The process of claim 18 wherein said promoter metal comprises from about 1.0 ppm by weight to about 3.0 ppm by weight of said mixture.

25. The process of claim 18 where in said promoter metal comprises from about 100 ppm by weight to about 2500 ppm by weight of said combustion promoter catalyst.

26. The process of claim 18 wherein said combustion promoter is present in an amount to provide an effluent flue gas with less than 50 ppm by weight carbon monoxide.

27. The process of claim 18 wherein said combustion promoter is present in an amount to provide an effluent flue gas with less than 10 ppm by weight carbon monoxide.

28. A process for fluid bed incineration of a combustible hydrocarbon feedstock comprising:
contacting said feedstock with a mixture of a fluidized heat transfer media and a combustion promoter catalyst, in the presence of an oxygen-containing gas stream in excess of that required for complete combustion of the carbon monoxide formed, at feedstock combustion conditions, said combustion promoter catalyst consisting essentially of particulate with a particle size of greater than 100 microns and comprising a Platinum Group promoter metal present in an amount to provide an effluent flue gas with less than 500 ppm by weight carbon monoxide.

* * * * *